(12) United States Patent
Wei et al.

(10) Patent No.: US 12,554,921 B2
(45) Date of Patent: Feb. 17, 2026

(54) ELECTRONIC DOCUMENT PROCESSING METHOD AND APPARATUS, TERMINAL AND STORAGE MEDIUM

(71) Applicant: Beijing Zitiao Network Technology Co., Ltd., Beijing (CN)

(72) Inventors: Ling Wei, Beijing (CN); Xuebin Yang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 123 days.

(21) Appl. No.: 18/286,107

(22) PCT Filed: Apr. 11, 2022

(86) PCT No.: PCT/CN2022/086082
§ 371 (c)(1),
(2) Date: Oct. 7, 2023

(87) PCT Pub. No.: WO2022/218251
PCT Pub. Date: Oct. 20, 2022

(65) Prior Publication Data
US 2024/0193352 A1    Jun. 13, 2024

(30) Foreign Application Priority Data
Apr. 14, 2021 (CN) .......................... 202110401811.2

(51) Int. Cl.
G06F 40/166 (2020.01)
G06F 3/04847 (2022.01)
G06F 21/62 (2013.01)

(52) U.S. Cl.
CPC ........ *G06F 40/166* (2020.01); *G06F 3/04847* (2013.01); *G06F 21/6209* (2013.01); *G06F 2221/2141* (2013.01)

(58) Field of Classification Search
CPC .................................................... G06F 40/166
See application file for complete search history.

(56) References Cited

U.S. PATENT DOCUMENTS 8,504,827 B1 * 8/2013 Sizer et al. ............. G06F 21/00
2006/0069987 A1 * 3/2006 Jones et al. ............. G06F 17/24
(Continued)

FOREIGN PATENT DOCUMENTS

CN    104461348 A    3/2015
CN    106970758 A    7/2017
(Continued)

OTHER PUBLICATIONS

International Patent Application No. PCT/CN2022/086082; Int'l Search Report; dated Jul. 7, 2022; 2 pages.
(Continued)

*Primary Examiner* — James J Debrow
(74) *Attorney, Agent, or Firm* — BakerHostetler (57) ABSTRACT

The present disclosure provides an electronic document processing method and apparatus, a terminal and a storage medium. The electronic document processing method comprises: in response to a first operation on target content of an electronic document, determining a target content block; and according to the first operation and the content type of the target content block, displaying at least one associated operation option, wherein the content block is a unit used for carrying the content of the electronic document, and the operation option is configured to use the content block as an operation object; and in response to a triggering operation on a target operation option, performing an operation on the target content block according to the target operation option.

20 Claims, 5 Drawing Sheets

--- in response to a first operation on target content of an electronic document, determining a target content block — S11 displaying at least one associated operation option according to the first operation and a content type of the target content block — S12 in response to a triggering operation on a target operation option, operating on the target content block according to the target operation option — S13

(56) References Cited

U.S. PATENT DOCUMENTS

| | | | |
|---|---|---|---|
| 2013/0019182 A1 | 1/2013 | Gil et al. | |
| 2013/0080900 A1 | 3/2013 | Wilde et al. | |
| 2013/0151958 A1* | 6/2013 | Muto et al. | G06F 17/00 |
| 2013/0339847 A1* | 12/2013 | Bartek et al. | G06F 17/00 |
| 2015/0227627 A1* | 8/2015 | Iwabuchi | G06F 17/30864 |
| 2017/0285914 A1* | 10/2017 | Ellbogen et al. | G06F 3/0482 |
| 2019/0227989 A1* | 7/2019 | Keel | G06F 16/168 |
| 2020/0233879 A1* | 7/2020 | Papanicolaou et al. | G06F 16/27 |

FOREIGN PATENT DOCUMENTS

| | | |
|---|---|---|
| CN | 109492210 A | 3/2019 |
| CN | 109635261 A | 4/2019 |
| CN | 109753204 A | 5/2019 |
| CN | 109800594 A | 5/2019 |
| CN | 112183045 A | 1/2021 |
| CN | 112328927 A | 2/2021 |
| CN | 113128182 A | 7/2021 |
| JP | H08-147294 A | 6/1996 |
| JP | 2006-065754 A | 3/2006 |
| JP | 2010-079577 A | 4/2010 |
| JP | 2013-058210 A | 3/2013 |
| JP | 2013-250820 A | 12/2013 |
| JP | 2014-521172 A | 8/2014 |
| JP | 2017-505962 A | 2/2017 |
| WO | WO 2015/015888 | 2/2015 |
| WO | WO 2016/065814 A1 | 5/2016 |

OTHER PUBLICATIONS

Written Opinion for International Application No. PCT/CN2022/086082, mailed Jul. 7, 2022, 09 Pages.

Japan Patent Application No. 2023-562663; Refusal Reason Notice; dated Sep. 24, 2024; 6 pages.

* cited by examiner

ELECTRONIC DOCUMENT PROCESSING METHOD AND APPARATUS, TERMINAL AND STORAGE MEDIUM

CROSS REFERENCE

This application is the U.S. National Stage of International Application No. PCT/CN2022/086082, titled "Electronic Document Processing Method and Apparatus, Terminal, and Storage Medium", filed on Apr. 11, 2022, which is filed based on the Chinese patent application No. 202110401811.2 with a filing date of Apr. 14, 2021, and a title of "Electronic Document Processing Method and Apparatus, Terminal, and Storage Medium", and claims priority to the Chinese Patent Application, both of which are incorporated herein by reference in their entireties.

TECHNICAL FIELD

The present disclosure relates to the field of computer technology, and particularly to an electronic document processing method and apparatus, a terminal and a storage medium.

BACKGROUND

With the development of computer technology, electronic documents are widely used. Electronic documents are typically stored on a server and may also be stored on a local client, and authorized users can access and edit the electronic documents.

SUMMARY

The present disclosure provided an electronic document processing method and apparatus, a terminal and a storage medium.

The present disclosure provides the following technical solutions. In some embodiments, the present disclosure provides an electronic document processing method, comprising: in response to a first operation on target content of an electronic document, determining a target content block; displaying at least one associated operation option according to the first operation and a content type of the target content block, wherein a content block is a unit for carrying content of an electronic document, and the operation option is configured to have a content block as an operation object;
  in response to a triggering operation on a target operation option, operating on the target content block according to the target operation option.

In some embodiments, the present disclosure provides electronic document processing apparatus, comprising:
  a determining unit, configured to, in response to a first operation on target content of an electronic document, determine a target content block;
  a displaying unit, configured to display at least one associated operation option according to the first operation and a content type of the target content block, wherein a content block is a unit for carrying content of an electronic document, and the operation option is configured to have a content block as an operation object; and
  a processing unit, configured to, in response to a triggering operation on a target operation option, operate on the target content block according to the target operation option.

In some embodiments, the present disclosure provides a terminal, comprising: at least one memory and at least one processor; wherein, the at least one memory is configured to store program code, and the at least one processor is configured to invoke the program code stored by the at least one memory to perform the method of any one of above.

In some embodiments, the present disclosure provides a storage medium configured to store program code, the program code being configured to perform the method of any one of above.

An electronic document processing method provided by an embodiment of the present disclosure, includes: in response to a first operation on target content of an electronic document, determining a target content block; displaying at least one associated operation option according to the first operation and a content type of the target content block; and in response to a triggering operation on a target operation option, operating the target content block according to the target operation option. In some embodiments of the present disclosure, the current user can evoke an operation option associated with the first operation and the content type of the target content block, thereby directly operating on the content block, and further improving convenience of operation.

BRIEF DESCRIPTION OF FIGURES

The foregoing and other features, advantages, and aspects of embodiments of the present disclosure will become more apparent in conjunction with the accompanying drawings and with reference to the following specific embodiments. Throughout the accompanying drawings, the same or similar accompanying symbols indicate the same or similar elements. It should be understood that the accompanying drawings are schematic and that elements and elements are not necessarily drawn to scale.

DETAILED DESCRIPTION

Embodiments of the present disclosure will be described in greater detail below with reference to the accompanying drawings. Although certain embodiments of the present disclosure are shown in the accompanying drawings, it should be understood, however, that the present disclosure may be realized in various forms and should not be construed as being limited to the embodiments set forth herein, but rather are provided for a more thorough and complete understanding of the present disclosure. It should be understood that the accompanying drawings and embodiments of the present disclosure are for exemplary purposes only and are not intended to limit the scope of protection of the present disclosure.

It should be understood that the various steps documented in the method embodiments of the present disclosure may be performed in accordance and/or in parallel. Furthermore, the method embodiments may include additional steps and/or omit performing the illustrated steps. The scope of the present disclosure is not limited in this regard.

As used herein, the term "including" and its variations are open-ended, i.e. "including but not limited to". The term "based on" is "based at least in part on". The term "one embodiment" means "at least one embodiment"; the term "another embodiment" means "at least one additional embodiment"; the term "another embodiment" means "at least one other embodiment."; and the term "some embodiments" means "at least some embodiments". Related definitions of other terms will be given in the following description.

It should be noted that the concepts of "first", "second" and the like mentioned in the present disclosure are only used to differentiate different devices, modules or units, and are not used to define the order or interdependence of the functions performed by these devices, modules or units.

It should be noted that the modification "a" referred to in the present disclosure is illustrative rather than limiting, and one of skill in the art should understand that it should be understood to mean "one or more" unless otherwise expressly indicated in the context.

The names of the messages or information interacting between the plurality of devices of the presently disclosed embodiments are used for illustrative purposes only and are not intended to limit the scope of such messages or information.

The embodiments provided by the embodiments of the present disclosure will be described in detail below in connection with the accompanying drawings.

Figure 1:
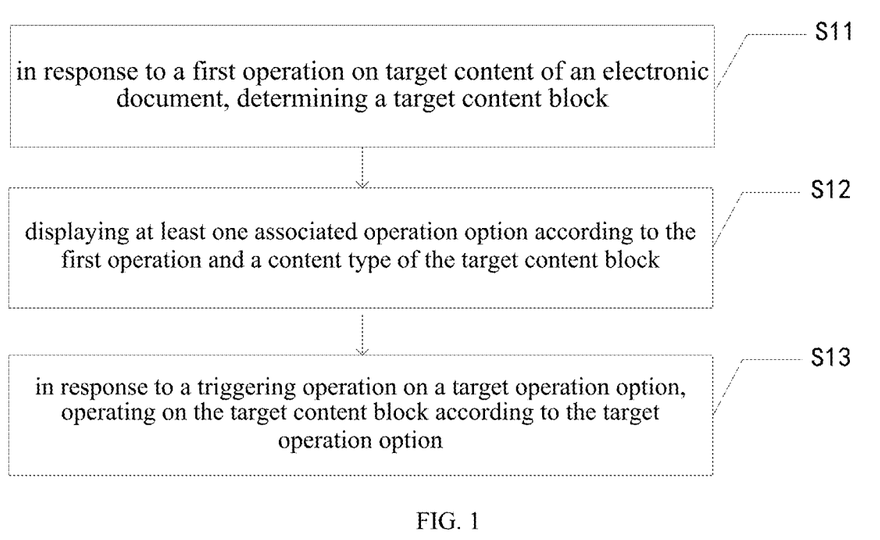
FIG. 1 is a flowchart of an electronic document processing method according to an embodiment of the present disclosure.

An electronic document processing method is proposed in some embodiments of the present disclosure, as shown in FIG. 1, including step S11 to step S13.

S11: in response to a first operation on target content of an electronic document, a target content block is determined.

In some embodiments, the electronic document includes at least one content block, the content block is a unit for carrying content of an electronic document, the target content block may be one content block or at least two content blocks. The content in a content block is not limited and may include, one or more of text, pictures, tables, etc. In some embodiments, a content block may be one paragraph or at least two paragraphs of an electronic document. The target content may be any content in the electronic document, such as text, pictures, tables, and the like.

S12: at least one associated operation option is displayed according to the first operation and a content type of the target content block.

In some embodiments, the first operation may be a click operation, a long press operation, or the like, which is not limited here, and the content type of the target content block may be a text type, a picture type, a document type, or the like. The operation options are related to the content type of the target content block, for example an option to change the font may be displayed in case the content type of the target content block is a text type, and in case the content type of the target content block is a picture type, the font cannot be changed and the operation options related to the font need not be displayed. The operation option is configured to operate with a content block as an operation object, i.e., the basic operation unit of the operation option is a content block rather than characters in an electronic document. In some embodiments, the operation option can operate on one or at least two content blocks, which is different from the operation option with characters as an operation unit in the related art. In some embodiments, the operation option is related to the first operation and a content type of the target content block, for example, different operation options may be displayed under a combination of different first operations and different content types. In some embodiments, alternative operation options may be determined based on the content type of the target content block, and then the operation options are determined and displayed from among the alternative operation options according to the first operation. For example, when the content type of the target content block is a picture, picture-related operation options (adjusting brightness, contrast, etc.) can be determined as alternative operation options, the operation options displayed in the alternative operation options are determined according to the first operation. For example, when the first operation is a sliding operation, the operation options displayed when sliding in different directions may be different, so that it is possible to easily and quickly locate the operation options that the user wants to use and reduce the number of operation options displayed on the display interface.

S13: in response to a triggering operation on a target operation option, the target content block is operated according to the target operation option.

In some embodiments, the trigger operation may be, for example, a click operation, a long press operation, etc., the trigger operation may be a combination of a plurality of operations, and the target operation option may be any one operation option.

In the related art, the electronic document provides operation options such as copying, cutting, and the like, however, these operation options are operated with characters as an operation object, thus when it is desired to operate on a paragraph or the like, the paragraph needs to be pulled and selected, causing inconvenience in use, and typically all relevant options are displayed when the operation options are displayed, it is difficult for a user to quickly locate a desired operation option, and a large display interface is occupied, while in some embodiments of the present disclosure, an associated operation option is summoned by the first operation and the content type of the target content block, the operation option is configured to operate with the content block as the operation object, so that the target content block can be directly operated, thereby improving the convenience of operation, and it is convenient for the user to quickly locate the desired operation option, and the display area occupied by the operation option can be reduced.

In some embodiments of the present disclosure, in response to the first operation on the target content of the electronic document, the step that the target content block is determined includes: in response to a trigger instruction to the target content, it is determined that a content block including the target content is the target content block; or in response to a trigger instruction to an associated region of the target content, it is determined that a content block corresponding to the associated region is the target content block. In some embodiments, some or all of the content in the target content block may be triggered to determine the target content block. In other embodiments, the content block has an associated region, the associated region may be, for example, the corresponding title of the content block, for example, in the case where the content block is a paragraph or a chapter, the title of the content block may be a paragraph title or a chapter title, and a target block corresponding to the title may be directly selected by performing a first operation on the title, thereby quickly selecting the target content block without performing a selection operation on the target content block as a whole.

Figure 2:
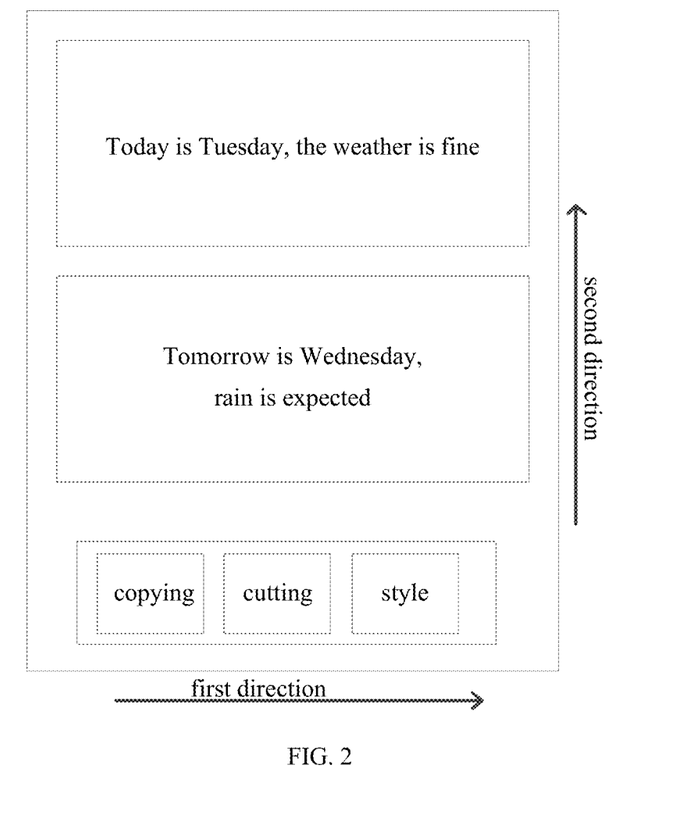
FIG. 2 is an interface display diagram of an electronic document according to an embodiment of the present disclosure.

In some embodiments of the present disclosure, the first operation includes a sliding operation in a first direction; in response to the first operation on the target content of the electronic document, the step that at least one associated operation option is displayed includes: the operation option is displayed in a second direction in a first region of a current page in response to a sliding operation of the target content in a first direction, the first region being a different region from a second region in which the target content block is located. In some embodiments, since sliding-up and sliding-down are generally given the meaning of switching display content, thus the sliding operation may be left sliding or right sliding, please refer to FIG. 2, FIG. 2 shows an electronic document having two content blocks therein, whose contents are "Today is Tuesday, the weather is fine" and "Tomorrow is Wednesday, rain is expected" respectively, the sliding operation is performed on either content block in a first direction to evoke the operation options ("copying", "cutting" and "style" in FIG. 2), and the operation options are summoned and displayed in a second direction. Since the first direction of the first operation is different from the second direction in which the operation option is displayed, the user can know that the operation option corresponds to the target content block, and if the first direction and the second direction are the same, the user cannot know whether the operation option is for operating on the entire electronic document or on the target content block.

In some embodiments of the present disclosure, when the second region in which the target content block is located is located in the first region, the step that the operation option is displayed in the second direction in the first region of the current page includes: the target content block is moved during display of the operation option, the target content block being on one side of the operation option In some embodiments, the location where the operation option is displayed and the location where the target content block is located may appear to coincide, at this point the operation option may occlude the target content block, this makes it difficult for the user to use, so that in some embodiments of the present disclosure, the target content block is automatically moved, for example, such that the electronic document is slid up or down as a whole, and the target content block is still kept in the current display interface, and the target content block is located on one side of the operation options, thereby facilitating the user's use.

In some embodiments of the present disclosure, the step that at least one associated operation option is displayed according to the first operation and the content type of the target content block includes: at least one associated operation option is displayed based on the first operation, the content type of the target content block and user rights of a current user. In some embodiments of the present disclosure, different types of operation options are associated with different user rights, and in some embodiments, different numbers of operation options are associated with different user rights. In some embodiments, the displayed operation options may be changed by the user, but the number and number of types of user-settable operation options may be associated with the user rights, and the number of operation options for different user rights may have different upper limits.

In some embodiments of the present disclosure, the method further includes: in response to an operation to change the content type of the target content block, the content type of the target content block is changed and the operation option is updated according to the changed content type of the target content block. In some embodiments, the user can make changes to the content type of the target content block, for example, there may be a content type change option among the operation options, changing the content type of the target content block is achieved by triggering the content type change option, e.g. a text type content block is changed into a picture type content block, after the content type is changed, the displayed operation option is updated according to the changed content type, for example, the operation option corresponding to the picture type is displayed.

In some embodiments of the present disclosure, the displayed operation option is updated according to the changed content type of the target content block in response to a change instruction to the content type of the target content block from the target terminal during the displaying of the operation option. In some embodiments, the target terminal may send a change instruction to a method execution subject in the embodiments of the present disclosure to change the content type of the target content block, and the displayed operation options are dynamically updated and displayed according to the changed content type of the target content block.

In some embodiments of the present disclosure, the method further includes: in response to an event that the operation option modifies an operation, the type and/or number of the associated operation option is modified. In some embodiments, different operation options associated with different first operations, content types or user rights may be modified, alternative operation options and alternative numbers may be set in advance for different first operations, content types and user rights, and a user of any user right may select no more than the alternative number of operation options from the alternative operation options. In some embodiments, the number and type of operation options associated with the user rights set by the current user are valid only for the current user.

In some embodiments of the present disclosure, the electronic document is a shared document, the shared document being operable by at least two authorized users simultaneously or non-simultaneously. In some embodiments, the shared document may be stored on a server, and different users may view or edit the shared document through different terminals at the same time, thereby implementing collaborative work, so that in some embodiments of the present disclosure, the target terminal may be a terminal used by another user.

Figure 3:
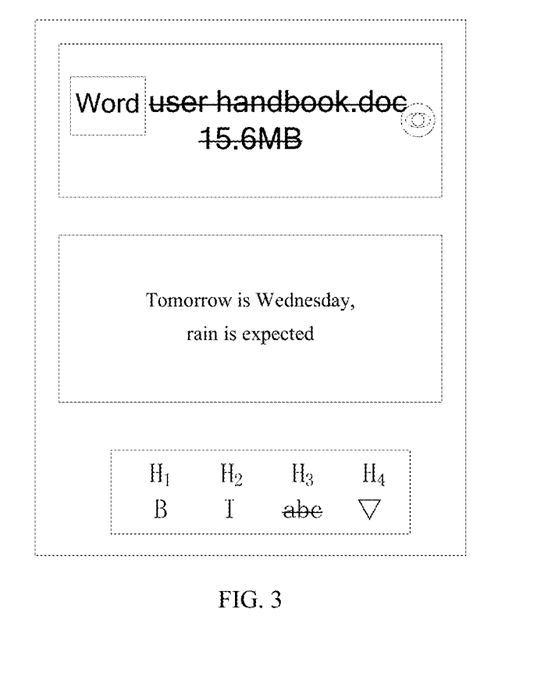
FIG. 3 is an interface display diagram of another electronic document according to an embodiment of the present disclosure.

In some embodiments of the present disclosure, the target content block includes: a link identifier of an attachment inserted or referenced within the electronic document, the link identifier having text displayed therein, wherein the text displayed within the link identifier has different editing properties from the text content input in the document, the text content input in the document can be directly selected and edited, while the text displayed within the link identifier cannot be selected, only the link itself can be selected in its entirety, i.e., the link is selected directly to open the corresponding link content; the target operation option includes a style modification option, and the operation on the target content block according to the target operation option includes: a display style of text within the link identifier is modified according to the selected style modification option. In some embodiments, please refer to FIG. 3, an attachment is introduced into the electronic document, such as "user handbook.doc", a link identifier of the attachment is displayed in the electronic document, and the title name of the attachment is usually used as the content of the link identifier. Assuming that the attachment is a separate target content block, after the user performs the first operation on the target content block, the operation options are displayed on the display interface of the electronic document, such as "B" for adjusting thickness, "/" for adjusting inclination and "abe" for adding strikeout displayed at the bottom of FIG. 3. In the embodiment of the present disclosure, strikeout can be displayed on the link identifier by selecting the strikeout option (as shown in FIG. 3). In the related art, after an attachment is introduced into the electronic document, a link (usually displayed as a title name) and an icon of the attachment are displayed, but the style of the title name in the link cannot be modified, resulting in disunity with the style of other contents in the electronic document and reducing the use experience of the user. In the embodiment of the present disclosure, the font style of the title in the link of the attachment can be modified, thereby improving the use experience of the user.

In some embodiments of the present disclosure, the operation option includes at least one of a comment option, a cut option, a copy option, a delete option, a copy link option, a style modification option, a format conversion option, and a content block alignment option. In some embodiments, the comment option is configured to display a comment region after being triggered, a comment on the target content block may be input in the comment region, the cut option is configured to cut the content block after being triggered, the copy option is configured to copy the content block after being triggered, the delete option is configured to delete the content block, the copy link option is configured to copy a link of the content block after being triggered, the link of the content block is configured to display the content block after being triggered, the style modification option is configured to modify the style of the content block, the style of the content block may include, for example, the color, font, etc. of the content block, the format conversion option is configured to change the format of the content block after being triggered, e.g., a text format is converted into a picture format, the content block alignment option is configured to align the content block after being triggered, e.g., it is unified to left alignment, right alignment, two-sided alignment, etc.

Figure 4:
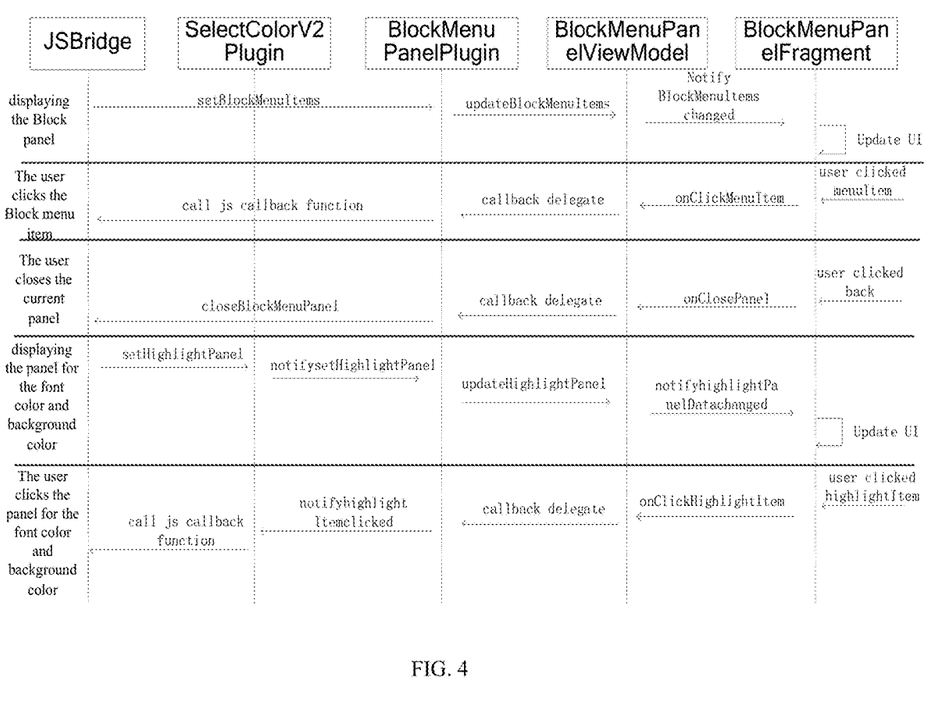
FIG. 4 is a timing diagram of an internal interaction of a terminal according to an embodiment of the present disclosure.

The following describes the method proposed in the embodiment of the present disclosure by taking the method proposed in the embodiment of the present disclosure for use in a terminal as an example. The electronic document is displayed on the terminal. The electronic document takes the content block (Block) as the basic unit, the content block can display words or pictures, a content block can be a paragraph, the user can evoke the operation option (Block panel) by sliding the content block left or right, the operation option can be multiple, the operation option is configured to operate the content block, the type and quantity of the operation option can be modified, the operation option can be triggered, for example, by clicking, and the operation option can be closed, for example, by clicking the blank space of the electronic document. Taking the method proposed in this embodiment for the client of the terminal as an example, the client is embedded with a browser to display the electronic document, and the user can modify the operation option. The terminal updates the operation option in response to the operation of modifying the operation option. Please refer to FIG. 4 for details. The terminal presents the Block panel, and the browser receives an operation to modify the operation option, and sends an instruction to modify the operation option to the BlockMenuPanelPlugin through the JSBridge middleware, and the BlockMenuPanelPlugin sends an instruction to update the operation option to the BlcokMenuPanelViewModel, and after the BlcokMenuPanelViewModel modifies the model according to the instruction, notifies the BlockMenuPanelFragment to update the display interface on the web page. After the user clicks any operation option, the BlockMenuPanelFragment will notify the BlcokMenuPanelViewModel to respond according to the operation option clicked by the user, the BlcokMenuPanelViewModel will send a callback instruction to the BlockMenuPanelPlugin, and the BlockMenuPanelPlugin will send an instruction for callback to the JSBridge to realize the function of operation option. After the user clicks on the background area, the operation option is closed by default. The BlockMenuPanelFragment will notify the BlcokMenuPanelViewModel to close the operation option, the BlcokMenuPanelViewModel will send a callback instruction to the BlockMenuPanelPlugin, and the BlockMenuPanelPlugin will send an instruction to the JSBridge for callback to close the operation option. In some embodiments, the operation option has sub-options, for example, the operation option may include displaying of a panel for the font color and background color, the user clicks on the panel, the JSBridge middleware sends a message to the SelectColorV2Plugin, the SelectColorV2Plugin sends a notification request to the BlockMenuPanelPlugin, the BlockMenuPanelPlugin notifies the BlockMenuPanelViewModel to require updating the display panel, the BlockMenuPanelViewModel updates the display panel and notifies the BlockMenuPanelFragment to update the display interface, after the BlockMenuPanelFragment updates the display interface and displays sub-options, the user can click any sub-option to modify the font color and the background color, the BlockMenuPanelFragment sends a message to the BlockMenuPanelViewModel after receiving the click operation, the BlockMenuPanelViewModel sends a callback instruction to the BlockMenuPanelPlugin, the BlockMenuPanelPlugin notifies the SelecColorV2Plugin, and the SelecColorV2Plugin notifies the JSBridge to make callback.

Figures 5, 6:
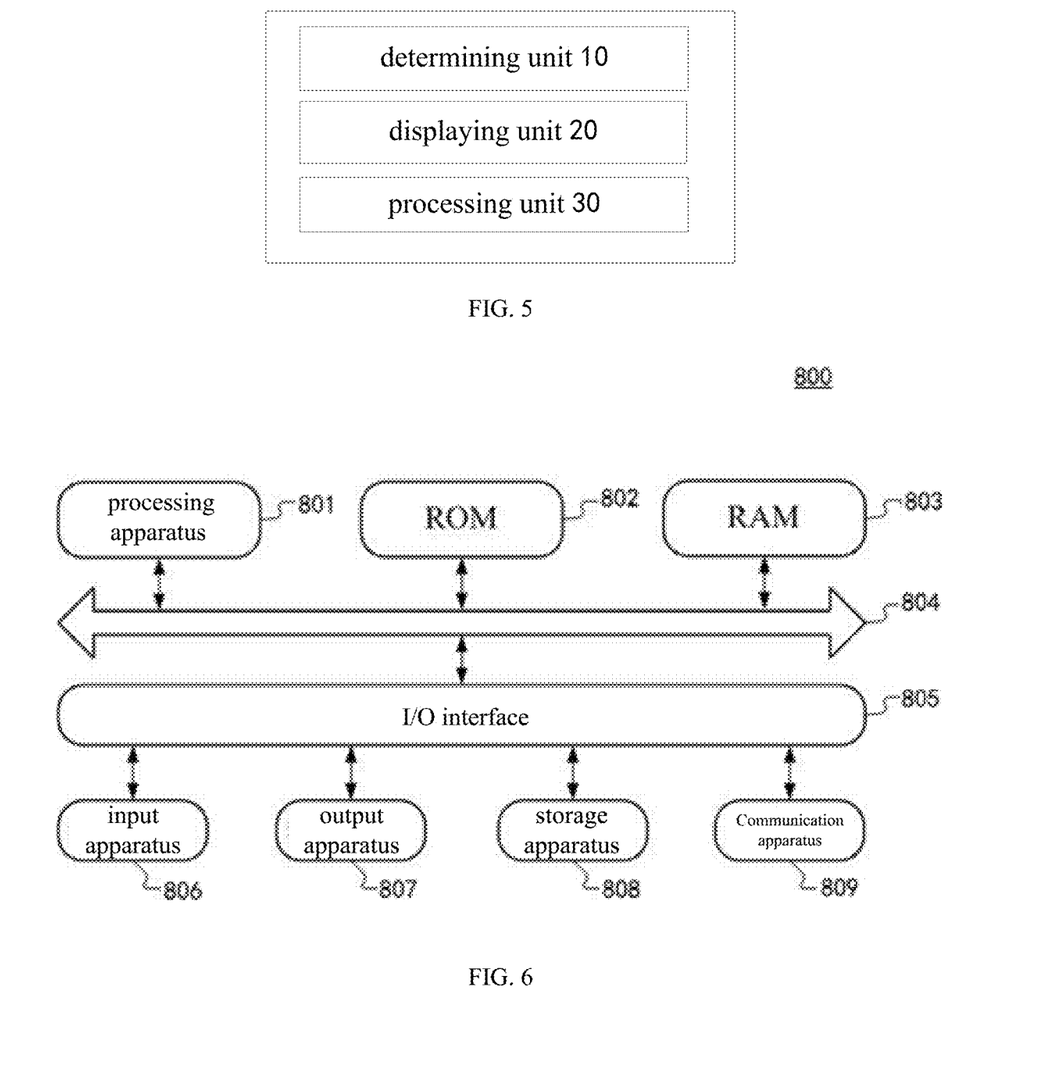
FIG. 5 is a composition diagram of an electronic document processing apparatus according to an embodiment of the present disclosure.
FIG. 6 is a structural schematic diagram of an electronic device according to an embodiment of the present disclosure.

Some embodiments of the present disclosure provide an electronic document processing apparatus, as shown in FIG. 5, including:
 a determining unit 10, configured to, in response to a first operation on target content of an electronic document, determine a target content block;
 a displaying unit 20, configured to display at least one associated operation option according to the first operation and a content type of the target content block, wherein a content block is a unit for carrying content of an electronic document, and the operation option is configured to have a content block as an operation object; and
 a processing unit 30, configured to, in response to a triggering operation on a target operation option, operate the target content block according to the target operation option.

In some embodiments, the step that the determining unit determines the target content block in response to the first operation on the target content of the electronic document includes: in response to a trigger instruction to the target content, it is determined that a content block including the target content is the target content block; or in response to a trigger instruction to an associated region of the target content, it is determined that a content block corresponding to the associated region is the target content block.

In some embodiments, the first operation includes a sliding operation in a first direction;
  in response to the first operation on the target content of the electronic document, the step that at least one associated operation option is displayed includes:
  the operation option is displayed in a second direction in a first region of a current page in response to a sliding operation of the target content in a first direction, the first region being a different region from a second region in which the target content block is located.

In some embodiments of the present disclosure, when the second region in which the target content block is located is located in the first region, the step that the operation option is displayed in the second direction in the first region of the current page includes: the target content block is moved during display of the operation option, the target content block being on one side of the operation option.

In some embodiments of the present disclosure, the step that the displaying unit displays at least one associated operation option according to the first operation and the content type of the target content block includes: at least one associated operation option is displayed based on the first operation, the content type of the target content block and user rights of a current user.

In some embodiments of the present disclosure, the display unit is further configured to: in response to an operation to change the content type of the target content block, change the content type of the target content block and update the operation option according to the changed content type of the target content block; or, update the displayed operation option according to the changed content type of the target content block in response to a change instruction to the content type of the target content block from the target terminal during the displaying of the operation option.

In some embodiments of the present disclosure, the display unit is further configured to, in response to an event that the operation option modifies an operation, modify the type and/or number of the associated operation option.

In some embodiments of the present disclosure, the electronic document is a shared document, the shared document being operable by at least two authorized users simultaneously or non-simultaneously.

In some embodiments of the present disclosure, the target content block includes: a link identifier of an attachment inserted or referenced within the electronic document, the link identifier having text displayed therein; and the target operation option includes a style modification option, and the operation on the target content block according to the target operation option includes: modifying a display style of text within the link identifier according to the selected style modification option.

In some embodiments of the present disclosure, the target operation option includes at least one of a comment option, a cut option, a copy option, a delete option, a copy link option, a style modification option, a format conversion option, and a content block alignment option.

Reference is made below to FIG. 6, which illustrates a schematic diagram of a structure of an electronic device (e.g., a terminal device or a server) 800 suitable for use in realizing embodiments of the present disclosure. Terminal devices in embodiments of the present disclosure may include, but are not limited to, mobile terminals such as cell phones, laptop computers, digital broadcast receivers, PDAs (personal digital assistants), PADs (tablet computers), PMPs (portable multimedia players), in-vehicle terminals (e.g., in-vehicle navigation terminals), and the like, as well as fixed terminals such as digital TVs, desktop computers, and the like. The electronic device illustrated in the drawings is merely an example and should not impose any limitation on the functions and scope of use of the embodiments of the present disclosure.

The electronic device 800 may include a processing apparatus (e.g., a central processor, a graphics processor, etc.) 801 that may perform various appropriate actions and processes based on programs stored in read-only memory (ROM) 802 or loaded from the storage apparatus 808 into random access memory (RAM) 803. Also stored in the RAM 803 are various programs and data necessary for the operation of the electronic device 800. The processing apparatus 801, the ROM 802, and the RAM 803 are connected to each other via a bus 804. An input/output (I/O) interface 805 is also connected to the bus 804.

Typically, the following devices may be connected to the I/O interface 805: an input apparatus 806 including, for example, a touch screen, a touch pad, a keyboard, a mouse, a camera, a microphone, an accelerometer, a gyroscope, and the like; an output apparatus 807 including, for example, a liquid crystal display (LCD), a loudspeaker, a vibrator, and the like; a storage apparatus 808 including, for example, a magnetic tape, a hard disk, and the like; and a communication apparatus 809. The communication apparatus 809 may allow the electronic device 800 to communicate wirelessly or wiredly with other devices to exchange data. Although electronic device 800 with various devices is illustrated in the figures, it should be understood that it is not required to implement or have all of the illustrated devices. More or fewer devices may alternatively be implemented or possessed.

In particular, according to embodiments of the present disclosure, the process described above with reference to the flowchart may be implemented as a computer software program. For example, embodiments of the present disclosure include a computer program product comprising a computer program carried on a computer-readable medium, the computer program comprising program code for performing the method shown in the flowchart. In such embodiments, the computer program may be downloaded and installed from a network via a communication apparatus 809, or from a storage apparatus 808, or from a ROM 802. In the event that the computer program is executed by the processing apparatus 801, the above-described functions defined in the method of an embodiment of the present disclosure are performed.

It is noted that the computer-readable medium described above in the present disclosure may be a computer-readable signaling medium or a computer-readable storage medium or any combination thereof. The computer-readable storage medium may, for example, be—but is not limited to—a system, device, or apparatus, or device of electricity, magnetism, light, electromagnetism, infrared, or semiconductors, or any combination of the above. More specific examples of computer-readable storage media may include, but are not limited to: electrical connections having one or more wires, portable computer disks, hard disks, random access memory (RAM), read-only memory (ROM), erasable programmable read-only memory (EPROM or flash memory), optical fibers, portable compact disk read-only memories (CD-ROM), optical storage devices, magnetic memory device, or any suitable combination of the foregoing. In the context of the present disclosure, a computer-readable storage medium may be any tangible medium containing or storing a program that may be used by or in combination with an instruction execution system, apparatus, or device. And in the context of the present disclosure, a computer-readable signal medium may include a data signal propagated in a baseband or as part of a carrier that carries computer-readable program code. Such propagated data signals may take a variety of forms, including, but not limited to, electromagnetic signals, optical signals, or any suitable combination of the foregoing. The computer-readable signal medium may also be any computer-readable medium other than a computer-readable storage medium that sends, propagates, or transmits a program for use by, or in combination with, an instruction-executing system, apparatus, or device. The program code contained on the computer-readable medium may be transmitted using any suitable medium, including, but not limited to: wire, fiber optic cable, RF (radio frequency), etc., or any suitable combination of the foregoing.

In some implementations, the client, server may communicate utilizing any currently known or future developed network protocol such as HTTP (HyperText Transfer Protocol), and may be interconnected with digital data communications (e.g., communication networks) of any form or medium. Examples of communication networks include local area networks ("LANs"), wide area networks ("WANs"), inter-networks (e.g., the Internet), and end-to-end networks (e.g., ad hoc end-to-end networks), as well as any currently known or future developed networks.

The above-described computer-readable medium may be contained in the above-described electronic device; or it may be separate and not assembled into the electronic device.

The above-described computer-readable medium carries one or more programs that, when the above-described one or more programs are executed by the electronic device, cause the electronic device to perform the above-described method of the present disclosure.

Computer program code for performing the operations of the present disclosure may be written in one or more programming languages or combinations thereof, including object-oriented programming languages—such as Java, Smalltalk, C++, conventional procedural programming languages—such as the "C" language or the like. "C" or similar programming languages. The program code may be executed entirely on the user's computer, partially on the user's computer, as a stand-alone software package, partially on the user's computer and partially on a remote computer, or entirely on a remote computer or server. In the case involving a remote computer, the remote computer may be connected to the user computer via any kind of network—including a local area network (LAN) or a wide area network (WAN)—or, alternatively, it may be connected to an external computer (e.g., by utilizing an Internet service provider to connect via the Internet).

The flowcharts and block diagrams in the accompanying drawings illustrate the architecture, functionality, and operation of systems, methods, and computer program products that may be implemented in accordance with various embodiments of the present disclosure. At this point, each box in the flowcharts or block diagrams may represent a module, program segment, or portion of code that contains one or more executable instructions for implementing a specified logical function. It should also be noted that in some implementations as replacements, the functions labeled in the boxes may also occur in a different order than those labeled in the accompanying drawings. For example, two consecutively represented boxes may actually be executed substantially in parallel, and they may sometimes be executed in reverse order, depending on the function involved. It should also be noted that each of the boxes in the block diagrams and/or flowcharts, and combinations of the boxes in the block diagrams and/or flowcharts, may be implemented with a specialized hardware-based system that performs the specified function or operation, or may be implemented with a combination of specialized hardware and computer instructions.

Units described as being involved in embodiments of the present disclosure may be implemented by way of software or may be implemented by way of hardware. Among other things, the name of a unit does not constitute a limitation of the unit itself in a given situation.

The functions described above herein may be performed, at least in part, by one or more hardware logic components. For example, non-limitingly, exemplary types of hardware logic components that may be used include: field programmable gate arrays (FPGAs), application-specific integrated circuits (ASICs), application-specific standard products (ASSPs), systems-on-chip (SOCs), complex programmable logic devices (CPLDs), and the like.

In the context of the present disclosure, a machine-readable medium may be a tangible medium that may contain or store a program for use by or in conjunction with an instruction execution system, device, or apparatus. The machine-readable medium may be a machine-readable signal medium or a machine-readable storage medium. The machine-readable medium may include, but is not limited to, an electronic, magnetic, optical, electromagnetic, infrared, or semiconductor system, device, or apparatus, or any suitable combination of the foregoing. More specific examples of machine-readable storage media would include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination of the foregoing. any suitable combination of the above.

According to one or more embodiments, the present disclosure provides an electronic document processing method, comprising: in response to a first operation on target content of an electronic document, determining a target content block;
  displaying at least one associated operation option according to the first operation and a content type of the target content block, wherein a content block is a unit for carrying content of an electronic document, and the operation option is configured to have a content block as an operation object; and
  in response to a triggering operation on a target operation option, operating on the target content block according to the target operation option.

According to one or more embodiments, the present disclosure provides an electronic document processing method, in response to the first operation on the target content of the electronic document, determining the target content block, comprises:
  in response to a trigger instruction to the target content, determining that a content block comprising the target content is the target content block; or
  in response to a trigger instruction to an associated region of the target content, determining that a content block corresponding to the associated region is the target content block.

According to one or more embodiments, the present disclosure provides an electronic document processing method, the first operation comprises a sliding operation in a first direction;

in response to the first operation on the target content of the electronic document, displaying at least one associated operation option comprises:

displaying the operation option in a second direction in a first region of a current page in response to a sliding operation of the target content in a first direction, the first region being a different region from a second region in which the target content block is located.

According to one or more embodiments, the present disclosure provides an electronic document processing method, when the second region in which the target content block is located is located in the first region, displaying the operation option in the second direction in the first region of the current page comprises:

moving the target content block during display of the operation option, the target content block being on one side of the operation option.

According to one or more embodiments, the present disclosure provides an electronic document processing method, displaying at least one associated operation option according to the first operation and the content type of the target content block comprising:

displaying at least one associated operation option based on the first operation, the content type of the target content block and user rights of a current user.

According to one or more embodiments, the present disclosure provides an electronic document processing method, further comprising:

in response to an operation to change the content type of the target content block, changing the content type of the target content block and updating the operation option according to the changed content type of the target content block; or,     updating the displayed operation option according to the changed content type of the target content block in response to a change instruction to the content type of the target content block from the target terminal during the displaying of the operation option.

According to one or more embodiments, the present disclosure provides an electronic document processing method, further comprising: in response to an event that the operation option modifies an operation, modifying the type and/or number of the associated operation option.

According to one or more embodiments, the present disclosure provides an electronic document processing method, the electronic document is a shared document, the shared document being operable by at least two authorized users simultaneously or non-simultaneously.

According to one or more embodiments, the present disclosure provides an electronic document processing method, the target content block comprises: a link identifier of an attachment inserted or referenced within the electronic document, the link identifier having text displayed therein; and the target operation option comprises a style modification option, and the operation on the target content block according to the target operation option comprises: modifying a display style of text within the link identifier according to the selected style modification option.

According to one or more embodiments, the present disclosure provides an electronic document processing method, the target operation option comprises at least one of a comment option, a cut option, a copy option, a delete option, a copy link option, a style modification option, a format conversion option, and a content block alignment option.

According to one or more embodiments, the present disclosure provides an electronic document processing apparatus, comprising: a determining unit, configured to, in response to a first operation on target content of an electronic document, determine a target content block;

a displaying unit, configured to display at least one associated operation option according to the first operation and a content type of the target content block, wherein a content block is a unit for carrying content of an electronic document, and the operation option is configured to have a content block as an operation object; and     a processing unit, configured to, in response to a triggering operation on a target operation option, operate on the target content block according to the target operation option.

According to one or more embodiments, the present disclosure provides a terminal, comprising: at least one memory and at least one processor; wherein, the at least one memory is configured to store program code, and the at least one processor is configured to invoke the program code stored by the at least one memory to perform the method of any one of above.

According to one or more embodiments, the present disclosure provides a storage medium configured to store program code, the program code being configured to perform the method of any one of above.

The above description is only a preferred embodiment of the present disclosure and an illustration of the technical principles utilized. It should be understood by those skilled in the art that the scope of disclosure involved in the present disclosure is not limited to technical solutions formed by a particular combination of the above technical features, but also covers other technical solutions formed by any combination of the above technical features or their equivalent features without departing from the above disclosed concept. For example, a technical solution formed by interchanging the above-mentioned features with technical features having similar functions disclosed in the present disclosure (but not limited to).

Furthermore, although the operations are depicted using a particular order, this should not be construed as requiring that the operations be performed in the particular order shown or in a sequential order of execution. Multitasking and parallel processing may be advantageous in certain environments. Similarly, while several specific implementation details are included in the above discussion, these should not be construed as limiting the scope of the present disclosure. Certain features described in the context of separate embodiments may also be implemented in combination in a single embodiment. Conversely, various features described in the context of a single embodiment may also be implemented in multiple embodiments, either individually or in any suitable sub-combination.

Although the present subject matter has been described using language specific to structural features and/or method logic actions, it should be understood that the subject matter limited in the appended claims is not necessarily limited to the particular features or actions described above. Rather, the particular features and actions described above are merely exemplary forms of realizing the claims.

What is claimed is:

1. A method for processing electronic document, comprising:

in response to a first operation on target content of an electronic document, determining a target content block, wherein a content block is a unit for carrying content of the electronic document;

determining a type of the target content block from a plurality of types, wherein the plurality of types comprise a text type, a picture type, and an attachment type;

determining at least one associated operation option based on the type of the target content block, wherein different types of content block are associated with different operation options;

displaying the at least one associated operation option according to the type of the target content block, wherein the at least one associated operation option is configured to have the target content block as an operation object; and in response to a triggering operation on a target operation option among the at least one associated operation option, operating on the target content block according to the target operation option.

2. The method of claim 1, wherein, in response to the first operation on the target content of the electronic document, determining the target content block, comprises:

in response to a trigger instruction to the target content, determining that a content block comprising the target content is the target content block; or in response to a trigger instruction to an associated region of the target content, determining that a content block corresponding to the associated region is the target content block.

3. The method of claim 1, wherein the first operation comprises a sliding operation in a first direction;

in response to the first operation on the target content of the electronic document, displaying at least one associated operation option comprises:

displaying the operation option in a second direction in a first region of a current page in response to a sliding operation of the target content in a first direction, the first region being a different region from a second region in which the target content block is located.

4. The method of claim 3, wherein, when the second region in which the target content block is located is located in the first region, displaying the operation option in the second direction in the first region of the current page comprises:

moving the target content block during display of the operation option, the target content block being on one side of the operation option.

5. The method of claim 1, wherein, displaying the at least one associated operation option according to the type of the target content block comprising:

displaying the at least one associated operation option based on the first operation, the content type of the target content block and user rights of a current user.

6. The method of claim 1, further comprising:

in response to an operation to change the content type of the target content block, changing the content type of the target content block and updating the operation option according to the changed content type of the target content block; or, updating the displayed operation option according to the changed content type of the target content block in response to a change instruction to the content type of the target content block from the target terminal during the displaying of the operation option.

7. The method of claim 1, further comprising:

in response to an event that the operation option modifies an operation, modifying the type and/or number of the associated operation option.

8. The method of claim 1, wherein the electronic document is a shared document, the shared document being operable by at least two authorized users simultaneously or non-simultaneously.

9. The method of claim 1, wherein, the target content block comprises: a link identifier of an attachment inserted or referenced within the electronic document, the link identifier having text displayed therein; and the target operation option comprises a style modification option, and the operation on the target content block according to the target operation option comprises: modifying a display style of text within the link identifier according to the selected style modification option.

10. The method of claim 1, wherein, the target operation option comprises at least one of a comment option, a cut option, a copy option, a delete option, a copy link option, a style modification option, a format conversion option, and a content block alignment option.

11. A device, comprising:

at least one memory and at least one processor;

wherein the at least one memory is configured to store program code, and the at least one processor is configured to invoke the program code stored by the at least one memory to perform operations, the operations comprising:

in response to a first operation on target content of an electronic document, determining a target content block, wherein a content block is a unit for carrying content of the electronic document;

determining a type of the target content block from a plurality of types, wherein the plurality of types comprise a text type, a picture type, and an attachment type;

determining at least one associated operation option based on the type of the target content block, wherein different types of content block are associated with different operation options;

displaying the at least one associated operation option according to the type of the target content block, wherein the at least one associated operation option is configured to have the target content block as an operation object; and in response to a triggering operation on a target operation option among the at least one associated operation option, operating on the target content block according to the target operation option.

12. The device according to claim 11, wherein, in response to the first operation on the target content of the electronic document, determining the target content block, comprises:

in response to a trigger instruction to the target content, determining that a content block comprising the target content is the target content block; or in response to a trigger instruction to an associated region of the target content, determining that a content block corresponding to the associated region is the target content block.

13. The device according to claim 11, wherein the first operation comprises a sliding operation in a first direction;

in response to the first operation on the target content of the electronic document, displaying at least one associated operation option comprises:

displaying the operation option in a second direction in a first region of a current page in response to a sliding operation of the target content in a first direction, the first region being a different region from a second region in which the target content block is located.

14. The device according to claim 13, wherein, when the second region in which the target content block is located is located in the first region, displaying the operation option in the second direction in the first region of the current page comprises:
    moving the target content block during display of the operation option, the target content block being on one side of the operation option.

15. The device according to claim 11, wherein, displaying the at least one associated operation option according to the type of the target content block comprising:
    displaying the at least one associated operation option based on the first operation, the content type of the target content block and user rights of a current user.

16. The device according to claim 11, the operations further comprising:
    in response to an operation to change the content type of the target content block, changing the content type of the target content block and updating the operation option according to the changed content type of the target content block; or,
    updating the displayed operation option according to the changed content type of the target content block in response to a change instruction to the content type of the target content block from the target terminal during the displaying of the operation option.

17. The device according to claim 11, the operations further comprising:
    in response to an event that the operation option modifies an operation, modifying the type and/or number of the associated operation option.

18. The device according to claim 11, wherein the electronic document is a shared document, the shared document being operable by at least two authorized users simultaneously or non-simultaneously.

19. The device according to claim 11, wherein,
    the target content block comprises: a link identifier of an attachment inserted or referenced within the electronic document, the link identifier having text displayed therein; and
    the target operation option comprises a style modification option, and the operation on the target content block according to the target operation option comprises: modifying a display style of text within the link identifier according to the selected style modification option.

20. A non-transitory storage medium configured to store program code, wherein the program code upon execution by a processor causes the processor to perform operations comprising:
    in response to a first operation on target content of an electronic document, determining a target content block, wherein a content block is a unit for carrying content of the electronic document;
    determining a type of the target content block from a plurality of types, wherein the plurality of types comprise a text type, a picture type, and an attachment type;
    determining at least one associated operation option based on the type of the target content block, wherein different types of content block are associated with different operation options;
    displaying the at least one associated operation option according to the type of the target content block, wherein the at least one associated operation option is configured to have the target content block as an operation object; and
    in response to a triggering operation on a target operation option among the at least one associated operation option, operating on the target content block according to the target operation option.

\* \* \* \* \*